United States Patent [19]

Nishimura et al.

[11] Patent Number: 5,447,001
[45] Date of Patent: Sep. 5, 1995

[54] VIBRATION CONTROL DEVICE FOR STRUCTURE

[75] Inventors: Isao Nishimura; Mitsuo Sakamoto, both of Tokyo, Japan

[73] Assignee: Kajima Corporation, Tokyo, Japan

[21] Appl. No.: 157,121

[22] Filed: Dec. 6, 1993

[30] Foreign Application Priority Data

Jun. 7, 1991 [JP] Japan .................. 3-136468

[51] Int. Cl.6 ............................................. E07D 27/34
[52] U.S. Cl. .................................................. 52/167.2
[58] Field of Search .................. 52/167 DF, 167 R; 248/562, 638

[56] References Cited

U.S. PATENT DOCUMENTS

| 4,924,639 | 5/1990 | Sato et al. | 52/167 DF |
| 4,924,640 | 5/1990 | Suizu et al. | 52/167 DF |
| 5,016,409 | 5/1991 | Sato | 52/167 DF |
| 5,022,201 | 6/1991 | Kobori et al. | 52/167 |

FOREIGN PATENT DOCUMENTS

| 556033 | 8/1993 | European Pat. Off. | 52/167 R |
| 63-76932 | 4/1988 | Japan . | |
| 1-275866 | 6/1989 | Japan . | |
| 1-275867 | 6/1989 | Japan . | |
| 1-275868 | 6/1989 | Japan . | |
| 1-275869 | 6/1989 | Japan . | |
| 3-70075 | 6/1991 | Japan . | |
| 3-38386 | 10/1991 | Japan . | |
| 4-157234 | 5/1992 | Japan . | |

Primary Examiner—Carl D. Friedman
Assistant Examiner—Creighton Smith
Attorney, Agent, or Firm—James H. Tilberry

[57] ABSTRACT

A substantially self-contained vibration control system for building structures. A building has mounted on its roof, or an upper level floor, a hollow concrete-steel first mass carried on high damping rubber supports. Within the hollow of the first mass a second mass is mounted on anti-friction rollers which roll on a low coefficient of friction interior floor of the first mass. The first and second masses are interconnected with a single means to vibrate these masses with a period of vibration which can be synchronized with the vibration period of the building to attenuate building vibration.

16 Claims, 3 Drawing Sheets

VIBRATION CONTROL DEVICE FOR STRUCTURE

BACKGROUND

1. Field of Invention

The field of invention relates to active type vibration control devices which protect building structures from damage due to seismic shock and/or high winds.

2. Description of Related Art

A dynamic damper (hereinafter designated as DD) is available as a vibration control device of the passive type, as shown in Japanese Pat. Laid-open No. 63-76932 and Japanese Pat. Publication No. 3-38686.

FIG. 4 of the present application shows a prior art vibration model of a DD as applied to a building structure having a mass $m_1$, comprising a main vibration system, and an additional mass body $m_d$, comprising a damping system. The building structure, having a spring constant $k_1$, and the additional mass body $m_d$ are connected through a spring having a spring constant $k_d$ and a damper having a damping coefficient $c_d$. Displacement of the structure is indicated by $x_1$, and $x_d$ represents a displacement of the additional mass body.

A natural angular frequency of the main vibration system is given by:

$$\omega_1 = (k_1/m_1)^{\frac{1}{2}}$$

In the DD, a mass $m_d$ of the damping system is designed so that the ratio of the mass $m_d$ to the mass $m_1$ of the main vibration system may be set as shown:

$$\mu = m_d/m_1 \geq 0.01.$$

At this time, the natural angular frequency of the damping system is given by:

$$\omega_d = (1/1 = \mu)\omega_1$$

A damping coefficient $c_d$ and a damping factor $h_d$ are respectively represented by:

$$c_d = 2m_d \omega_d h_d$$

$$h_d = [3\mu/8(1+\mu)]^{\frac{1}{2}}$$

There is also known in the prior art a device called an Active Mass Driver (hereinafter AMD), which is a vibration control device of an active type, such as shown in U.S. Pat. No. 5,022,201.

FIG. 5 shows a prior art vibration model of an AMD, which applies a control force u(t) provided by hydraulic pressure or electromagnetic force, or the like, from an actuator between the building structure, having a mass $m_1$, and an additional mass body, having a mass $m_d$, to actively control the vibration of the building structure.

In the AMD, assuming that a spring between the building structure and the additional mass body, constituting a vibration control device, is set under a soft condition, i.e., $$\omega_d \leq (1/1)\omega_1$$

the control force u(t) is given in the following equation:

$$u(t) = G_1(dx_1/dt) + G_2(dx_d/dt)$$

wherein $G_1$ is a gain in a circuit including an AGC circuit or the like against the response speed of the structure to obtain corresponding large inputs from small inputs. The second term in the above equation gives a damping property to the additional mass body as well as stability thereof by adding the product of a gain $G_2$ (negative sign) to a vibration speed of the additional mass body by the control force.

Active tuned mass dampers (ATMD hereinafter) have been made which add a spring, having a spring constant $k_d$, in parallel with the control force provided by an actuator, as shown in the vibration model of FIG. 6 to obtain a vibration control effect to the same degree as an AMD, but by means of less control force in comparison with that of the AMD.

In the case of an ATMD, a spring constant $k_d$ is set so that the vibration of an additional mass body may synchronize with that of the building, that is, $$\omega_d = \omega_1$$

and the resulting control force u(t) is, for example given by the following equation:

$$u(t) = G_1(dx_1/dt) + G_2(dx_d/dt) + G_3(x_1 - x_d)$$

wherein $G_3$ is a gain having a negative sign and cancels a part of the inertial force applying on the additional mass body at a vibration time to the third term in the above equation so that the additional mass body may be vibrated by less control force.

Furthermore, there is a disclosure in Japanese Pat. Publication No. 3-70075 showing means for controlling the vibration of a building structure due to an earthquake or the like by an extremely small control force. A second additional mass body, having a mass less than that of the first mentioned additional mass body, is connected to the first mentioned additional mass body of the DD through a spring. An actuator applies a control force to the second additional mass body. The mass of the second additional mass body is selected so as to obtain a higher vibration control effect by a far smaller control force in comparison with the AMD or ATMD. However, this system has problems such as vibrations and noise produced by the first and/or the second additional mass body, similar to vibration and noise problems associated with AMD and ATMD systems. Further, the AMD and ATMD systems present both maintenance problems and installation and space problems, which should be considered in selecting a vibration control system to protect a building structure.

The present invention provides solutions to these problems, and additionally provides a vibration control system with high reliability, safety, and efficiency in operation and maintenance.

SUMMARY OF THE INVENTION

The vibration control system of the present invention is an active double DD having first and second additional masses which co-act with the vibratable mass of the building structure.

In a preferred embodiment of the invention, the first additional mass comprises a hollow hexahedral body having a predetermined mass $m_a$. The structural body is supported on a plurality of laminated rubber dampers, each with a spring constant $k_a$ and a predetermined damping coefficient $c_a$. The rubber dampers are supported on a planar surface of the building structure, such as the roof or an upper level floor.

A second additional mass, having a predetermined mass $m_b$, is placed inside the first additional mass structural body to function as a mass driver, which is excitable by a control force u(t).

The value of the spring constant $k_a$ of the rubber dampers is determined such that the vibration period of the first additional mass is synchronized with the natural period of the building structure. On the other hand, the damping coefficient $c_a$ of the rubber dampers is considerably larger than in the DD, and the first additional mass is vibrated by a force imparted to it by the second additional mass functioning as a mass driver. Although other means can be used to support the first additional mass, high-damping laminated rubber supports are preferred since an optimum spring constant $k_a$ and a high damping coefficient $c_a$ are easily obtained. Other forms of dampers include the combination of an air spring and damping material, and a combination of laminated rubber and other forms of damping materials, so long as a predetermined spring capacity and damping capacity can be obtained.

The control force u(t) can be provided in a form of electromagnetic force, hydraulic pressure, or the like, and the control force is applied on the basis of the response of the structure to external vibrational forces such as earthquake and wind or a seismic response analysis.

OBJECTS OF THE INVENTION

It is therefore among the objects of the invention to provide a vibrational control system for a building structure that solves the problems of prior art DD, AMD, and ATMD devices, such as excessive noise and vibration, as well as installation, space, and maintenance problems. It is also among the objects of the invention to provide a vibration control system for a building structure which is highly reliable, safe, and efficient in operation and maintenance.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF PREFERRED EMBODIMENTS OF THE INVENTION

Figure 1:
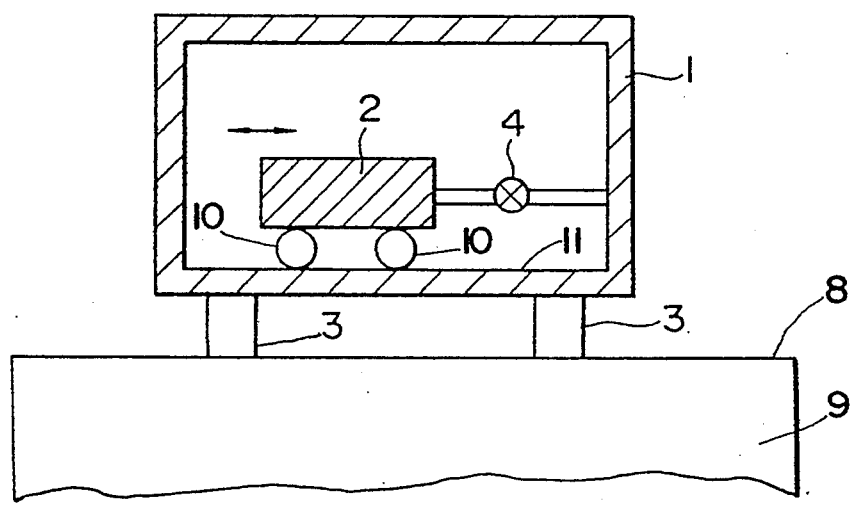
FIG. 1 is an elevational view in section of a preferred embodiment of the invention.

FIG. 1 shows a hollow hexahedral first additional mass 1; a second additional mass 2 which functions as a vibration driver; and an actuator 4 connecting the second additional mass 2 to the first additional mass 1. The first additional mass 1 may be formed of concrete and steel, or the like, and rests on a plurality of high-damping laminated rubber supports 3 secured to a floor surface or roof 8 of a building 9.

The driver 2, as the second additional mass body, is mounted on anti-friction rollers 10 to travel on the floor surface 11, which has a low coefficient of friction, of the first additional mass 1.

Figure 2:
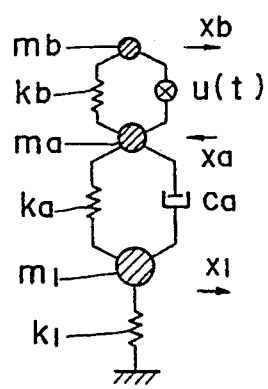
FIG. 2 is a vibration model diagram of another preferred embodiment of the invention.

Whereas the embodiment of FIG. 1 shows a combination of DD and AMD, the model of FIG. 2 shows a combination of DD and ATMD. In FIG. 2, $m_1$ represents the mass of a building structure 9, constituting a main vibration system, $m_a$ represents the mass of the first additional mass 1, and $m_b$ represents the mass of the second additional mass 2, respectively. In addition, $k_1$ is a spring constant to the building structure; $k_a$ is the spring constant of the high-damping laminated rubber supports; $c_a$ is the damping coefficient of the rubber supports; $k_b$ is the spring constant of a spring between the first additional mass body 1 and the second additional mass 2; and u(t) is the control force between the first and second additional masses. Further, $x_1$ represents displacement of the building structure 9; $x_a$ represents displacement of the first additional mass 1; and $x_b$ represents displacement of the second additional mass body 2.

When a large building structure, such as a multi-storied building, is subjected to vibration control, the mass of the first additional mass is approximately equal to 1/500 to 1/1000 of the mass of the structure, including the mass of the second additional mass body and that of the actuator. Further, the mass of the second additional mass is approximately 1/20 to 1/100 of the mass of the first additional mass.

As a specific numerical example, when the total weight of a building structure is 100,000 tons, the first additional mass will weigh approximately 100 tons, and the second additional mass will weigh approximately 5 tons.

By using the parameters in FIG. 2, angular frequencies $\omega_1$, $\omega_a$ and $\omega_b$ of the main vibration system, the first additional mass body and the second additional mass body, respectively, are represented by:

$$\omega_1 = (k_1/m_1)^{\frac{1}{2}}$$

$$\omega_a = (k_a/m_a)^{\frac{1}{2}}$$

$$\omega_b = (k_b/m_b)^{\frac{1}{2}}$$

By synchronizing these angular frequencies, the relation of the following equation is established:

$$\omega_1 \approx \omega_a \approx \omega_b$$

Further, a relationship of the mass of the structure, that of the first additional mass and that of the second additional mass as described above can be represented by:

$$m_a/m_1 = 1/500 \text{ through } 1/1000$$

$$m_b/m_a = 1/10 \text{ through } 1/100$$

The damping coefficient $c_a$ of the rubber damper supports against the first additional mass can be represented by:

$$c_a = 2m_a\omega_a h_a$$

In the above equation, $h_a$ is a damping factor of the rubber damper supports and a large damping factor of as much as $h_a = 10\%$ to 50% is used in the design of the supports, for the reason which will be given hereinbelow.

The control force for controlling the motion of the second additional mass is defined by the following equation:

$$u(t) = G_1(d^2x_1/dt^2) + G_2(dx_b/dt) + G_3(x_b - x_a) \quad (1)$$

wherein $G_1$, $G_2$ or $G_3$ is a gain in each term of the above equation (1).

Energy is mainly exhausted by the damper function (damping coefficient $c_a$) of the rubber damper supports.

Since the angular frequency $\omega_a$ of the first additional mass is in synchronization with the angular frequency $\omega_1$ of the main vibration system, a dynamic damper is formed. However, the damping coefficient $c_a$ is enlarged more than the optimum design value which is in excess of the damping coefficient with which dynamic dampers normally function.

When the control force $u(t)$ is applied and the first additional mass (mass $m_a$) is vibrated, the first additional mass body flexes a far greater distance than the normal DD, and, therefore, the vibration control effect of the subject invention is greater.

Even in the case where the response acceleration of the building structure is minimal, the gain $G_1$ in the first term of the above equation (1) gives a control force in the form of amplifying the response acceleration, and, as a result, the vibration control effect can be increased.

The reaction force of the control force $u(t)$ is treated by using the inertia force of the second additional mass body (mass $m_b = 1/10$ $m_a$ through $1/100$ $m_a$).

The second term in the above equation (1) is a term for affording a damping property to the second additional mass driver by using a relation between the action and the reaction, and, there fore, the stability of the vibration of the second additional mass body can be attained. In order to synchronize the angular frequency $\omega_a$ of the second additional mass body with the angular frequency $\omega_1$ of the main vibration system, the gain $G_2$ can be represented by:

$$G_2 = 2m_b\omega_1 h$$

and also can be set so that the damping coefficient h may be within the range of 0.1 through 0.2 (10% through 20%).

Additionally, by making use of the principle of the ATMD described above, the angular frequency $\omega_b$ of the second additional mass body is kept synchronized with the angular frequency $\omega_1$ of the building structure vibration system. Since the spring force (spring constant $k_b$) absorbs most of the force required for the control, the force necessary for the control is further lessened. In other words, the control force $u(t)$, the inertia force $[m_b(dx_b/dt)^2]$ and the spring force $[k_b(x_b - x_a)]$ act on the second additional mass body, and the relation is given by:

(control force) + (inertia force) + (spring force) = 0

Since the inertia force and the spring force almost cancel each other in the above equation, the control force becomes extremely small. In this case, a synchronizing angular frequency $$\omega_b' (= [(k_b + G_3)/m_b]^{\frac{1}{2}})$$

created by the gain $G_3$(negative value, e.g., approximately $-k_b \times 0.9$ or $-k_b \times 0.8$ being chosen) in the third term of the above equation (1), is set so as to be not more than half of the angular frequency $\omega_b$ of the second additional mass.

As a result, a synchronization is created to the period component of, for example, approximately 16 seconds (in case of $G_3 = -k_b \times 0.9$), in addition to the period component of 5 seconds of the response acceleration of a structure to be used as an input, and it is necessary to provide an appropriate filter to the gain $G_1$ so as to reduce the control force.

A high-pass filter is used to control the conventional ATMD, but since a normal high-pass filter has a large out-of-phase component, a cut-off frequency has to be considerably apart so that no appreciable effect has been obtained. Therefore, devices are required with a filter having a readily definable characteristic without any out-of-phase component.

Figure 3:
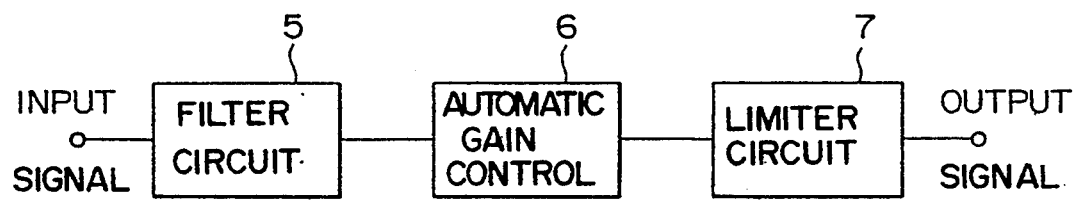
FIG. 3 is a block diagram showing a partial control circuit employed in the preferred embodiment of the invention.
Figure 4:
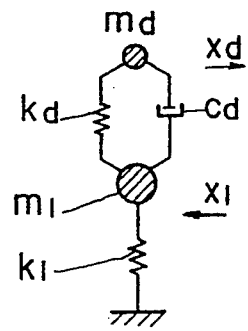
FIG. 4 is a vibration model diagram of a prior art DD.
Figure 5:
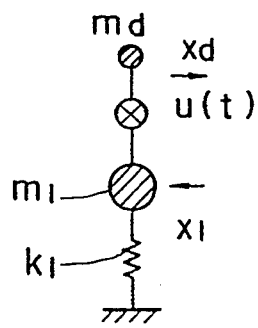
FIG. 5 is a vibration model diagram of a prior art AMD.
Figure 6:
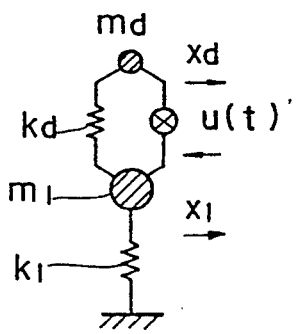
FIG. 6 is a vibration model diagram of a prior art ATMD.

FIG. 3 is a simplified block diagram showing a part of a control circuit as an embodiment of the present invention and corresponds to the first term in the above equation (1). Inputs are the response acceleration of the structure by earthquake, wind or the like, and amplified by a circuit composed of a filter circuit 5, an AGC circuit 6 and a limiter circuit 7.

There is no out-of-phase component in the neighborhood of an objective vibration frequency in the filter circuit 5. The filter circuit 5 has a readily definable characteristic and a transfer characteristic thereof is given by, for example, the following Laplace function:

$$H(s) = (s^2 + 2G_1\xi_n\omega_n s + \omega_n^2)/(s^2 + 2\xi_n\omega_n s + \omega_n^2) \quad (2)$$

The output multiplied by Gain G (e.g., a value multiplied by about 20) is obtained thereby at the objective angular frequency $\omega_n$ (corresponding to a primary angular frequency of the structure), and there is no out-of-phase at this angular frequency. The damping factor $\xi_n$ takes a value, for example, within the range of 0.2 through 0.5 (20% through 50%). Likewise, the out-of-phase is not created even in high and low frequency ranges but only created before or after the objective angular frequency. By the use of this filter, the control displacement and the control force required for the above control method are remarkably reduced.

The AGC circuit 6 is normally used for audio circuits or the like, but, by adopting this circuit, the vibrations ranging from a large input to a small input can be successfully processed, and the vibration control effect can be enhanced. However, since the AGC circuit 6 alters the amplification factor while the AGC circuit is accompanied by a time delay to some extent, the output is restricted by the limiter circuit 7, so as to prevent any excessive output signal from generating, in particular, during the early stage of vibration.

The control force for controlling the action of the second additional mass driver is not always restricted to the above equation (1), and the control force can also be defined by, for example, the following example:

$$u(t) = G_1'(dx_1/dt) + G_2'(x_a - x_1) + G_3'(dx_b/dt) + G_4'(x_b - x_a) \quad (3)$$

wherein $G_1'$, $G_2'$, $G_3'$ or $G_4'$ is a gain in each term of the above equation (3). In equation (3), the speed ($dx_1/dt$) of the structure is fed back.

The control described above is applied to any high frequency earthquake or strong wind. For a larger earthquake in excess of the performance capacity of the device, means to stop the drive of the second additional mass might also be possible for preventing damage to the inventive system. Even when the performance capability of this inventive system is exceeded, the system may function as a passive type DD, and a vibration control effect equal to that of a DD can be obtained.

Possibility of Industrial Utilization:

By installing the vibration control device of the present invention to a building structure, the following advantages can be obtained.

1. A large vibration control effect with the drive of an extremely small mass can be obtained by using and modifying the feature of an AMD having a driver to a single additional mass.

2. Since the first additional mass is formed with a chamber and the driver is accommodated in the chamber, any noise produced by the driver is muffled within the chamber and is hard to be heard outside, and any harmful vibration is intercepted by the high damping rubber supports and thus is not transmitted to the building structure.

3. Since a drive mechanism such as the driver and the actuator is protected by a structural enclosure such as the first additional mass, the device can be easily and completely installed on the roof of a building structure.

4. In view of the fact that the second additional mass driver can be installed within the first additional mass structure, the first additional mass is mounted on high damping rubber supports and the second additional mass is very small in comparison to that of the building structure, any possible influence on the building structure is extremely slight, even if the second additional mass should be driven into a runaway mode by forces that overwhelm the ability of the second additional mass to function as a driver.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. A vibration control device for a structure having a natural period of vibration and a predetermined mass, comprising: a first additional mass body with a predetermined mass having an interior chamber, a support body for supporting said first additional mass body, and a driver with a predetermined mass as a second additional mass body, which is provided in said interior chamber of said first additional mass body and movable relative to said first additional mass body by a control force acting between said first additional mass body and said second additional mass body, wherein said support body has a spring constant for giving a predetermined period of vibration to said first additional mass body corresponding to said natural period of vibration of said structure, said support body also having a predetermined damping coefficient.

2. A vibration control device for a structure according to claim 1, wherein said driver is connected to said first additional mass body through a spring having a predetermined spring constant.

3. A vibration control device for a structure according to claim 2, wherein said predetermined mass of said first additional mass body is 1/500 through 1/1000 of the said predetermined mass of said structure.

4. A vibration control device for a structure according to claim 3, wherein the mass of said driver second additional mass body is 1/20 through 1/100 of the said predetermined mass of said first additional mass body.

5. A vibration control device for a structure according to claim 1, wherein said support body is a plurality of distributively placed high-damping laminated rubbers.

6. A vibration control device for a structure according to claim 5, wherein said driver is connected to said first additional mass body through a spring having a predetermined spring constant.

7. A vibration control device for a structure according to claim 6, wherein the said predetermined mass of said first additional mass body is 1/500 through 1/1000 of the said predetermined mass of said structure.

8. A vibration control device for a structure according to claim 7, wherein the mass of said driver second additional mass body is 1/20 through 1/100 of the said predetermined mass of said first additional mass body.

9. A self-contained vibration control device to protect a building structure having a natural period of vibration from vibration caused by seismic shock or high wind, comprising: high damping support means for securing to the roof or upper level floor of a building structure, having a spring constant selected to provide a predetermined period substantially corresponding to the said natural period of vibration of said building structure; a first mass, having an interior chamber, adapted to be secured to said high damping support means; a second mass placed in said interior chamber for vibrating movement therein; and means to vibrate said second mass at a frequency selected to vibrate said first mass, wherein said high damping support means is vibrated with substantially the same period as the natural period of said building structure to attenuate vibration of said building structure.

10. The device of claim 9, including anti-friction means secured to said second mass adapted to facilitate vibration of said second mass.

11. The device of claim 10, wherein said anti-friction means comprise rollers secured to said second mass.

12. The device of claim 9, including a floor in said first mass interior chamber to support said second mass, said floor having a low coefficient of friction to facilitate vibration of said second mass.

13. The device of claim 9, including spring means to interconnect said first and second masses, said spring means having a predetermined spring constant to facilitate vibration of said second mass.

14. The device of claim 9, wherein said first mass is substantially 1/500 to 1/1000 of the mass of said building structure.

15. The device of claim 9, wherein said second mass is substantially 1/20 to 1/100 of the mass of said first mass.

16. The device of claim 9, wherein said high damping support means comprise laminated rubber columns of sufficient height to permit lateral shifting of said first mass relative to said building structure.

* * * * *

UNITED STATES PATENT AND TRADEMARK OFFICE
CERTIFICATE OF CORRECTION

PATENT NO. : 5,447,001
DATED : September 5, 1995
INVENTOR(S) : Isao Nishimura, et al It is certified that error appears in the above-indentified patent and that said Letters Patent is hereby corrected as shown below:

```
On the Title Page, Item [22], change to read
—[22] PCT filed:  June 5, 1992—.
On the Title Page, add Item [86] PCT No:  PCT/JP92/00729
                                 371 Date:  Dec. 6, 1993
                                 102(e) Date:  Dec. 6, 1993
                            [87] PCT Pub. No.:  WO 92/21841
                                 PCT Pub. Date:  Dec. 10, 1992
```

Signed and Sealed this

Ninth Day of January, 1996

*Attest:*

BRUCE LEHMAN

*Attesting Officer*     *Commissioner of Patents and Trademarks*